Figure 1:
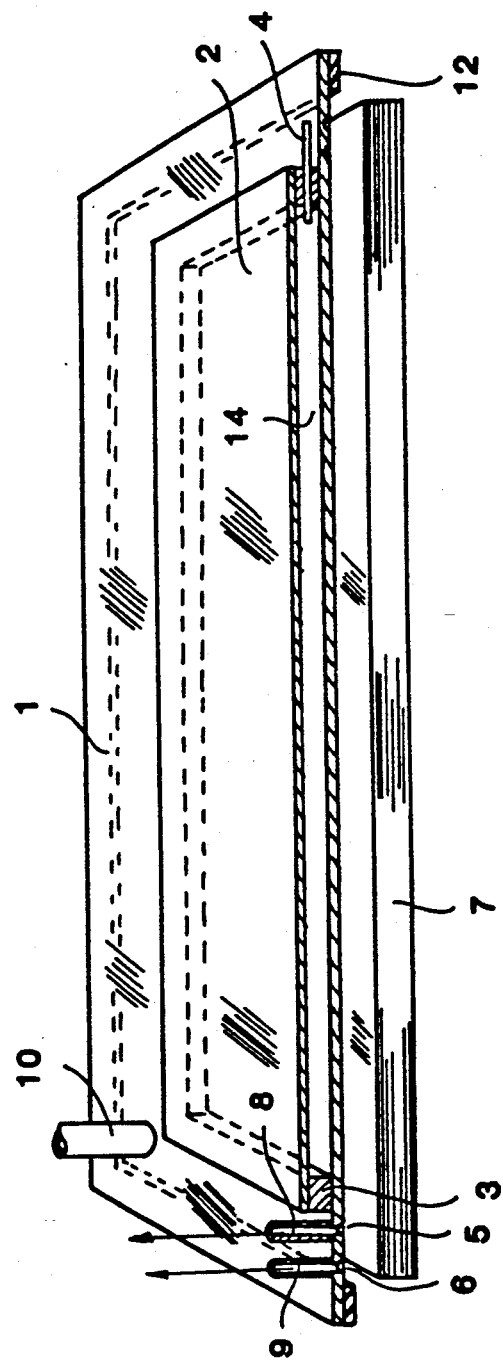

United States Patent
Dillow

Patent Number: 5,206,680
Date of Patent: Apr. 27, 1993

[54] CONTACT PRINT FRAME HAVING A DOUBLE GLASS

[75] Inventor: Brian S. Dillow, Vällingby, Sweden
[73] Assignee: Misomex AB, Sweden
[21] Appl. No.: 862,845
[22] Filed: Apr. 3, 1992
[51] Int. Cl.$^5$ ............................................. G03B 27/20
[52] U.S. Cl. .................................................... 355/91
[58] Field of Search ........................ 355/87, 91, 92, 94

[56] References Cited

U.S. PATENT DOCUMENTS

| | | | |
|---|---|---|---|
| 4,523,840 | 6/1985 | Hagedorn-Olsen | 355/91 |
| 4,704,028 | 11/1987 | Richards, Sr. | 355/92 |
| 5,017,960 | 5/1991 | Tuulse | 355/91 |

Primary Examiner—Richard A. Wintercorn
Attorney, Agent, or Firm—Larson and Taylor

[57] ABSTRACT

A contact print frame of the type which is especially adapted to move one or more transparent films (7) into intimate contact with a light sensitive printing plate (11), a light sensitive collection film or any other light sensitive medium and to expose/print said one or more transparent films (7) onto said light sensitive medium (11), and comprising a supporting transparent glass, named contact glass (1), which has, as conventional, vacuum grooves (5, 6) at the bottom surface thereof for vacuum connecting an original/master film (7) and eventually also a masking film to said contact glass (1), and which is arranged to be pressed into contact with the printing plate (11) etc. during the exposure/printing process, and an assisting glass (2) which is carried by the contact glass (1) and which is sealingly connected thereto on a slight distance above the upper surface of the contact glass (1), an air pressure chamber (14) formed between the the sealingly interconnected contact and assisting glasses (1, 2), means (4) for putting said air pressure chamber (14) under a slight positive pressure, so that the contact glass (1) is thereby cambering slightly convexly towards the printing plate (11) while the contact print frame with the contact glass (1) is being moved into contact with the printing plate (11).

4 Claims, 1 Drawing Sheet

CONTACT PRINT FRAME HAVING A DOUBLE GLASS

The present invention generally relates to a contact print frame of the well known type which in especially adapted to bring, during an exposure or printing step, at least one original/master film and eventually also a masking film into intimate contact with a light sensitive "collection film", a printing plate or any other light sensitive material and to expose/print said one or more films onto the light sensitive material.

A contact print frame of this type is normally, at the underside thereof, formed with at least one vacuum groove, but normally two vacuum grooves or channels, namely an inner vacuum groove for vacuum connecting a masking film to the glass plate, and an outer vacuum groove for vacuum connecting an original/master film to the masking film and to the glass plate. The contact print frame is also arranged for pickung up, from a mask magazine and/or a film magazine, a masking film and an original film or master film and to move the contact print frame with said vacuum connected to contact glass of the contact print frame into contact with a collection film, a printing plate or any other light sensitive material, and to bring the collection film/the printing plate into intimate contact with the film or films carried by contact glass of the print frame by means of vacuum.

In the following only the case is to be discussed, in which an original film or master film is printed onto a printing plate, but it is to be noted that the situation is identically the same onto whatever light sensitive medium that the master film and/or the masking film is being printed.

It is necessary that a good print contact is obtained between the master film and the masking film and the printing plate, and for this purpose it is necessary that any and all air is evacuated from between the film or films and the printing plate. This air evacuation has for a long time caused problems. It easily and often happens that air is entrapped when the "plate contact vacuum" is engaged between the copy print frame and the printing plate, and such trapped air volumes can only very slowly be removed at the edges of the contact print frame. Any such entrapped air volumes give an imperfect contact between the film and the printing plate, and this, in turn, leads to an unsharp image outline on the printing plate.

Many different attempts have been made to quickly and effectively remove any air from between the films and the printing plate. For instance, it has been suggested that the printing plate be placed on a rubber blanket or a thin flexible metal plate which is fixedly connected to the copy print table only along its edges thereof, so that the central parts of the rubber blanket or the metal plate can lift from the copy print table and adapt itself the printing plate following the unevensses of the copy print frame, and thereby hopefully simplify a pressing out or air which is trapped between the film or films and the printing plate.

This type of system, however, gives only a slight improvement of the effect. In addition thereto there may appear problems in that the printing plate is not safely fixed to the copy print table, whereby the printing plate may move slightly in relation to the film or films on the copy print frame.

It has also been suggested that rollers be mounted movably underneath the printing plate, which rollers are being rolled alternatingly in two opposite directions under the printing plate for the purpose of pressing any existing air out from between the film or films and the printing plate.

This method is technically complicated since the rollers necessarily must operate from the underside of the printing plate. Otherwise said rollers would be positioned between the exposure light and the copy print frame and would thereby disturb the exposure. Also in this type of system there are problems in having the printing plate steadily fixed on a copy print table, and there is a risque that the printing plate and the master film are being displaced in relation to each other during the print process. Further, this system is technically complicated and comprises several movable parts.

It has also been suggested that the copy print glass be formed convexly for the purpose that the glass should successively get in contact with the printing plate starting from the centre thereof. For this system it is necessary, however, that both the master film and the printing plate can bow or camber to a concave shape corresponding to the convex shape of the contact print glass. This is not always possible, and as a consequence it may happen that the master film and/or the masking film, when being picked up and vacuum connected to the copy print glass, shrinkles adjacent the outer edges thereof and/or that the central parts of the film or films become stretched and widened. In both cases a bad register between the film and the printing plate is obtained and unsharp images are obtained at the copy printing.

Further, all the above mentioned proposals have lead to expensive, complicated or ineffective apparatus and methods in one or more respects. Therefore, there is still a need for an simple, effective and quick method of pressing air out from between the films and the printing plate, in particular a method and an apparatus by means of which the air is quickly and extremely effectively pressed out from the contact surface between the master film and/or the masking film and a printing plate, starting from the central point of the film/printing plate unit and proceeding successibly outwards from said central point.

The present invention solves the said problem in that the contact print frame is formed with two glasses which are sealingly connected to each other forming an air pressure chamber therebetween, and which comprises means for introducing air of a predetermined positive pressure in the air pressure chamber between the two glasses at the same time as the master film and the printing plate are brought into vacuum contact, whereby the contact glass bows or cambers slightly convexly towards the printing plate at the moment a contact is being reached with the printing plate, whereas the contact glass successively becomes more and more even or levelled as the actual contact area between the copy print glass and the master film increases.

The apparatus is advantageous in several respects as compared with previously known apparatus and methods:

the contact glass is even when the original film and/or the master film is picked up, and it becomes slightly convexly cambered only when the pressure is applied in the air pressure chamber between the two glasses, and this is done concurrently with bringing the contact glass with the films into contact with the printing plate;

the air is very quickly and effective pressed out from the contact surface between the film and the printing plate, and it has proved to be possible to reduce the contact vacuum time before the exposure light is put on to only 25-30% of the time which is normally needed in previously known apparatus.

the apparatus gives an extremely good contact between the film or films and the printing plate;

the process cycle time for the entire exposure or print method can be substantially reduced;

the apparatus is simple, cheap and easily handled;

the copy print frame can be connected to most available copy print machines on the market, etc.

Figure 2:
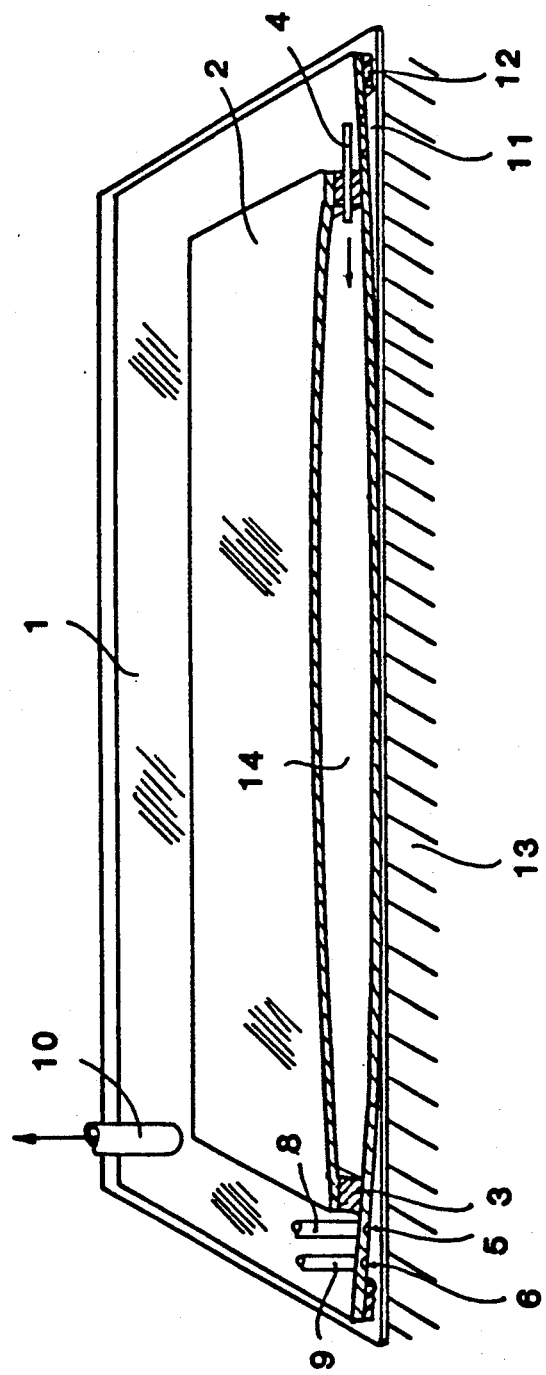

The invention is now to be more closely described with reference to the accompanying drawings, in which FIG. 1 diagramatically shows a cross section through a copy print frame according to the invention in its non-activated condition and shortly before a master film and/or the masking film is/are picked up from a film magazine, FIG. 2 correspondingly shows the apparatus of the invention at the moment when the contact glass of the copy print frame with the master film and/or masking film has just started to get into contact with the printing plate.

The copy print frame shown in the drawings comprises a supporting glass plate 1, generally referred to as the contact glass, which glass plate carries an assisting glass plate 2. The supporting glass plate 1 preferably is mounted in a metal framing which is not shown in the drawings, and by means of which the entire copy print frame can be mounted in a copy print machine of a known type. The assisting glass plate 2 is sealingly connected to the supporting glass plate 1 on a slight distance above said supporting glass plate 1, for instance in that a thin sealing strip 3 is interposed between the glasses 1 and 2 adjacent the edges thereof. A tube 4 extends through the sealing strip 3, and this tube 4 is connected to a (not illustrated) source of pressure, by means of which air of a slight positive pressure can be introduced in the sealed chamber 14 between the contact glass 1 and the assisting glass 2, for instance a pressure of 2-10 kPa above normal atmospheric pressure. The magnitude of the positive pressure depends on the thickness of the glass plated 1 and 2.

As usual the contact glass plate 1 has, at the bottom surface thereof, at least one all around extending vacuum groove or channel, but preferably two sets of all around extending vacuum grooves 5 and 6 for vacuum connecting two transparent films to the bottom surface of the glass 1, namely a masking film (not shown in the drawings) by means of the inner groove 5 and a master film 7 by means of the outer groove 6. Each of the two vacuum grooves 5 and 6 is connected to a source of vacuum by means of connection tubes 8 and 9 respectively. Further, the supporting glass 1 is connected to an addition source of vacuum by means of a vacuum tube 10 provided inside the vacuum grooves 5 and 6. Said vacuum tube 10 is adapted to establish a vacuum between the copy print frame and a printing plate 11, see FIG. 2. For providing a sealing between the copy print frame and the printing plate the contact glass 1 has a sealing strip 12 of rubber extending along the edges of the contact glass at the bottom surface thereof.

The most important feature of the invention is that the contact glass 1 slightly cambers convexly downwards, that is towards the printing plate. The magnitude of said cambering movement is only about 1%, or even less, of the diagonal length of the contact glass at the beginning contact with the printing plate 11. This cambering downwards, which may amount to only some millimeters, makes the copy print frame with the film 7 or films successively get into contact with the printing plate (or the collection film or any other light sensitive material), which lies on an even table 13, starting from the centre of the copy print frame and the printing plate and proceeding successively outwards in all directions from said centre. Thereby any air which necessarily exists between the contact glass 1 of the copy print frame, the film 7 or films and the printing plate 11 is quickly and effectively pressed out. The printing plate 11 is also quickly and effectively vacuum connected or pressed into contact with the contact glass 1. Is has proved that it is possible to reduce the total "plate contact vacuum" time to only about 25-30% of the time which is needed in priorly known apparatus. When the printing plate 11 has been brought into full vacuum contact with the copy print frame the pressure of the closed air chamber 14 can be released, and thereby the contact glass 1, like also the assisting glass 2 and the film 7 or films become completely even or levelled.

It is also important that the contact glass 1 is even when a mask film and a master film 7 are vacuum connected and/or pressed into contact with the contact glass 1, and the air pressure chamber 14 is not put under air pressure until the film 7 or films have been vacuum connected into contact with the contact glass 1. For obtaining the intended effect it is quite sufficient to use such weak positive pressure in the pressure chamber 14 that the contact 1 glass cambers only slightly downwards and the assisting glass 2 correspondingly cambers only slightly upwards in relation to the edges of the glasses 1 and 2, for instance cambers up to only about 1% as calculated on the diagonal length of the contact glass. For normal size contact glasses this means a cambering size of only a few millimeters. It is sufficient to use a positive pressure of only about 2-10 kPa over normal atmospheric pressure. The size of the positive pressure depends on the thickness of the glass plates 1 and 2.

The apparatus is operated as follows:

The contact print frame is moved into position above a masking film and/or an original film or master film, or preferably into position above a magazine of master films. The copy print frame is lowered so that the contact glass 1 comes into contact with the uppermost film 7 in the magazine. The vacuum channels 5 and 6 are put under vacuum via the tubes 8 and 9, whereby the master film, and also the masking film if any, are connected by vacuum to the contact glass 1 which is still even. While maintaining the vacuum in the channels 5 and 6 the copy print frame is moved into position above a printing plate 11 which lies on an even table 13. The air pressure chamber 14 between the contact glass 1 and the assisting glass 2 is put under a slight positive pressure, whereby the two glasses camber slightly convexly outwards, which means that the contact glass 1 cambers downwards and the assisting glass 2 cambers upwards. The copy print frame is moved into contact with the printing plate 11, whereby the central part of contact glass—as shown strongly exaggerated in FIG. 2—first comes into contact with the printing plate. When the copy print frame is lowered and is being pressed into contact with the printing plate 11 a successively larger part of the contact glass 1 is pressed into contact with the printing plate 11, whereby any air existing between the contact glass 1, the films 7 and the printing plate 11 is being pressed out starting from the central point of the copy print frame and successively out towards the edges thereof. The air is quickly and effectively pressed out. Plate connection vacuum now is activated by the tube 10 which is connected to a source of vacuum and the printing plate 11 is thereby vacuum connected into contact with the contact glass 1. The positive pressure in the air pressure chamber 14 now can and should be released, and the exposure or printing is made as usual with an even printing plate 11, and even contact glass 1 and even films 7.

Reference Numerals

1: contact glass
2: assisting glass
3: sealing strip
4: pressure tube
5: vacuum groove (for mask film)
6: vacuum groove (for master film)
7: film (in film magazine)
8: vacuum tube (to 5)
9: vacuum tube (to 6)
10: plate contact vacuum tube
11: printing plate
12: sealing strip
13: table
14: pressure chamber

I claim:

1. A contact print frame of the type which is especially adapted to move one or more transparent films (7) into intimate contact with a light sensitive printing plate (11), a light sensitive collection film or any other light sensitive medium and to expose/print said one or more transparent films (7) onto said light sensitive medium (11), and comprising a supporting transparent glass, named contact glass (1), which has, as conventional, vacuum grooves (5, 6) at the bottom surface thereof for vacuum connecting an original/master film (7) and eventually also a masking film to said contact glass (1), and which is arranged to be pressed into contact with the printing plate (11) during the exposure/printing process, and an assisting glass (2) which is carried by the contact glass (1) and which is sealingly connected thereto on a slight distance above the upper surface of the contact glass (1), an air pressure chamber (14) formed between the the sealingly interconnected contact and assisting glasses (1, 2), means (4) for putting said air pressure chamber (14) under a slight positive pressure, so that the contact glass (1) is thereby cambering slightly convexly towards the printing plate (11) while the contact print frame with the contact glass (1) is being moved into contact with the printing plate (11).

2. A contact print frame according to claim 1, in which the contact glass (1) is of such thickness and strength that said contact glass (1) cambers convexly in the direction towards the light sensitive printing plate (11) by a cambering size of about 1% as calculated on the diagonal length of the contact glass (1) when the air pressure chamber (14) is put under positive pressure.

3. A contact print frame according to claim 1 in which said means for pressurizing the air pressure chamber (14) comprises a tube (4) which is connected to a source of pressurized air and which sealingly extends into said air pressure chamber (14).

4. A contact print frame according to claim 1 said means for pressurizing the air pressure chamber (14) provides a pressure inside said chamber (14) which is 2–10 kPa above normal atmospheric pressure, depending on the thickness of the contact glass (1) and the assisting glass (2).

* * * * *